(12) United States Patent
Scotney et al.

(10) Patent No.: US 11,388,248 B1
(45) Date of Patent: Jul. 12, 2022

(54) DYNAMIC DOMAIN DISCOVERY AND PROXY CONFIGURATION

(71) Applicant: StratoKey Pty Ltd., Hobart (AU)

(72) Inventors: Anthony Scotney, Hobart (AU); Sabyasachi Routray, Hobart (AU)

(73) Assignee: StratoKey Pty Ltd.

( * ) Notice: Subject to any disclaimer, the term of this patent is extended or adjusted under 35 U.S.C. 154(b) by 0 days.

(21) Appl. No.: 17/405,947

(22) Filed: Aug. 18, 2021

(51) Int. Cl.
*H04L 67/56* (2022.01)
*H04L 9/40* (2022.01)

(52) U.S. Cl.
CPC .............. *H04L 67/28* (2013.01); *H04L 63/20* (2013.01)

(58) Field of Classification Search
CPC ................................ H04L 63/20; H04L 67/28
See application file for complete search history.

(56) References Cited

U.S. PATENT DOCUMENTS

| | | | |
|---|---|---|---|
| 6,829,638 B1 * | 12/2004 | McBrearty | H04L 67/1002 709/219 |
| 8,566,247 B1 | 10/2013 | Nagel | |
| 9,076,004 B1 | 7/2015 | Bogorad | |
| 10,594,721 B1 | 3/2020 | Scotney | |
| 10,798,064 B1 | 10/2020 | Scotney | |
| 10,880,322 B1 * | 12/2020 | Jakobsson | H04L 51/08 |
| 10,936,751 B1 | 3/2021 | Scotney | |
| 11,042,506 B2 | 6/2021 | Aksionkin | |
| 11,089,126 B1 | 8/2021 | Scotney | |
| 2003/0079120 A1 | 4/2003 | Hearn | |
| 2003/0200331 A1 | 10/2003 | Mahajan | |
| 2004/0024826 A1 | 2/2004 | Halahmi | |
| 2005/0132286 A1 | 6/2005 | Rohrabaugh | |
| 2006/0004719 A1 | 1/2006 | Lawrence | |

(Continued)

FOREIGN PATENT DOCUMENTS

CN        101398871 A        4/2009

OTHER PUBLICATIONS

"Flashproxy: Transparently Enabling Rich Web Content via Remote Execution", Jun. 17-20, 2008, MobiSys'08, Breckenridge, Colorado, USA, retrieved from http://citeseerx.ist.psu. edu/viewdoc/download;jsessionid= 159110DAEE75CBDD05764EBEC094321D?doi=10.1.1.143.671 7&rep=rep1 &type=pdf on Mar. 11, 2021. (Year: 2008) 13 Pages.

(Continued)

*Primary Examiner* — Gil H. Lee
(74) *Attorney, Agent, or Firm* — Mahamedi IP Law LLP

(57) ABSTRACT

A proxy server system implements dynamic domain discovery and proxy configuration. The proxy server system maintains proxy mapping data including a plurality of mappings, each mapping associating a domain and a proxy string. The proxy server system receives a request including a proxy link, generates a native link that includes a domain associated with the third-party network service, and obtains a resource including native content from the third-party network service. The proxy server system identifies, in the native content, a first embedded native link having a first domain associated with the third-party network service, determines that the proxy mapping data does not include any mapping corresponding to the first domain, generates a first mapping associating the first domain and a first proxy string, and updates the proxy mapping data to include the first mapping.

20 Claims, 4 Drawing Sheets

(56) References Cited

U.S. PATENT DOCUMENTS

| | | |
|---|---|---|
| 2006/0149590 A1 | 7/2006 | Palmer |
| 2007/0300057 A1 | 12/2007 | Corcoran |
| 2008/0301805 A1 | 12/2008 | Bharara |
| 2009/0063952 A1 | 3/2009 | Raghavachari |
| 2009/0217354 A1 | 8/2009 | Blum |
| 2010/0071052 A1 | 3/2010 | Mao |
| 2010/0088389 A1 | 4/2010 | Buller |
| 2012/0030294 A1 | 2/2012 | Piermot |
| 2012/0117458 A1 | 5/2012 | Holloway |
| 2013/0346453 A1 | 12/2013 | Procopio |
| 2014/0006357 A1 | 1/2014 | Davis |
| 2014/0046906 A1 | 2/2014 | Patiejunas |
| 2014/0095865 A1 | 4/2014 | Yerra |
| 2014/0122866 A1 | 5/2014 | Haeger |
| 2014/0129457 A1 | 5/2014 | Peeler |
| 2014/0282936 A1 | 9/2014 | Fitzgerald |
| 2014/0337614 A1 | 11/2014 | Kelson |
| 2015/0039887 A1 | 2/2015 | Kahol |
| 2015/0067881 A1 | 3/2015 | Badstieber |
| 2015/0249684 A1 | 9/2015 | Zhang |
| 2015/0278545 A1 | 10/2015 | Bigras |
| 2016/0004729 A1 | 1/2016 | Evans |
| 2016/0087933 A1* | 3/2016 | Johnson ............... H04L 67/125 709/245 |
| 2016/0171227 A1 | 6/2016 | Margolin |
| 2016/0217269 A1 | 7/2016 | Goettges |
| 2016/0234330 A1 | 8/2016 | Popowitz |
| 2016/0261668 A1 | 9/2016 | Joel |
| 2016/0269371 A1 | 9/2016 | Coimbatore |
| 2017/0034100 A1 | 2/2017 | Zink |
| 2017/0236129 A1 | 8/2017 | Kholkar |
| 2017/0243028 A1 | 8/2017 | LaFever |
| 2017/0286437 A1 | 10/2017 | Stevens |
| 2018/0025011 A1 | 1/2018 | Aksionkin |
| 2018/0063117 A1 | 3/2018 | Tseng |
| 2019/0286850 A1 | 9/2019 | Popescu |
| 2020/0065523 A1 | 2/2020 | Fukuda |
| 2020/0073940 A1 | 3/2020 | Grosset |
| 2020/0175484 A1* | 6/2020 | Kumar ................ G06Q 20/12 |
| 2020/0213345 A1 | 7/2020 | Scotney |
| 2020/0236187 A1* | 7/2020 | Tai ........................ H04L 67/16 |
| 2021/0021573 A1 | 1/2021 | Scotney |
| 2021/0344770 A1 | 11/2021 | Scotney |
| 2022/0019695 A1 | 1/2022 | Scotney |

OTHER PUBLICATIONS

Linh et al. Compliance monitoring in business processes: Functionalities, application and tool-support. Information Systems. vol. 54. Dec. 2015. pp. 209-234. https://www.sciencedirect.com/science/article/pii/S0306437915000459 (Year: 2015).

* cited by examiner

DYNAMIC DOMAIN DISCOVERY AND PROXY CONFIGURATION

BACKGROUND

Cloud, SaaS and web applications are increasingly adopted by enterprises. The use of hosted services can expose an enterprise to security issues because hosted services typically store information outside the enterprise's corporate firewall. The information may include confidential, personal, and/or sensitive information, including data that may be subject to privacy standards, laws, and/or regulations. This shift towards cloud, SaaS and web applications has forced enterprises to search for mechanisms to independently secure these systems, such as proxy services. A proxy server is a server application that acts as an intermediary between a client requesting a resource and a server hosting the resource. For example, suffix proxy servers allow users to access web content by appending a domain of the proxy server to the Uniform Resource Locator ("URL") of the requested content. That is, to access a resource hosted by a service via the proxy server, a user uses a proxy link that includes a domain associated with the proxy server. The proxy server uses a corresponding native link that includes a domain associated with the service to obtain the resource and forward the resource to the user.

One major constraint with suffix proxy servers is the handling of subdomains. Complicated cloud, SaaS and web applications may use an extensive number of subdomains. For example, complex geographically-distributed applications often make extensive use of subdomains for traffic routing, load balancing and redundancy. While Secure Socket Layer (SSL) certificate infrastructure allows for a single-level wildcard certificate for one subdomain level, many applications utilize multiple subdomain levels. In some solutions, transformations on a native link may be used to reduce subdomain levels in the corresponding proxy link.

To effectively operate a suffix proxy to access these services, some conventional approaches require manual configuration to associate proxy links used to access resources via the proxy service and native links used to obtain the resources from the service. For example, manually-generated proxy configuration data for a service may specify all domains used by the service to support each subdomain to at least a wildcard level. This can be complex and time consuming and require both network tracing and extensive research. If the service makes domain changes and/or additions after manual configuration is performed, the proxy configuration must be manually updated with new definitions for these domains. Given the fast-moving nature of SaaS applications, an end user can experience outages or "jumping the proxy", where a request goes directly to the service and circumvents the proxy server) if changes are made to the SaaS application.

DETAILED DESCRIPTION

Figure 1:
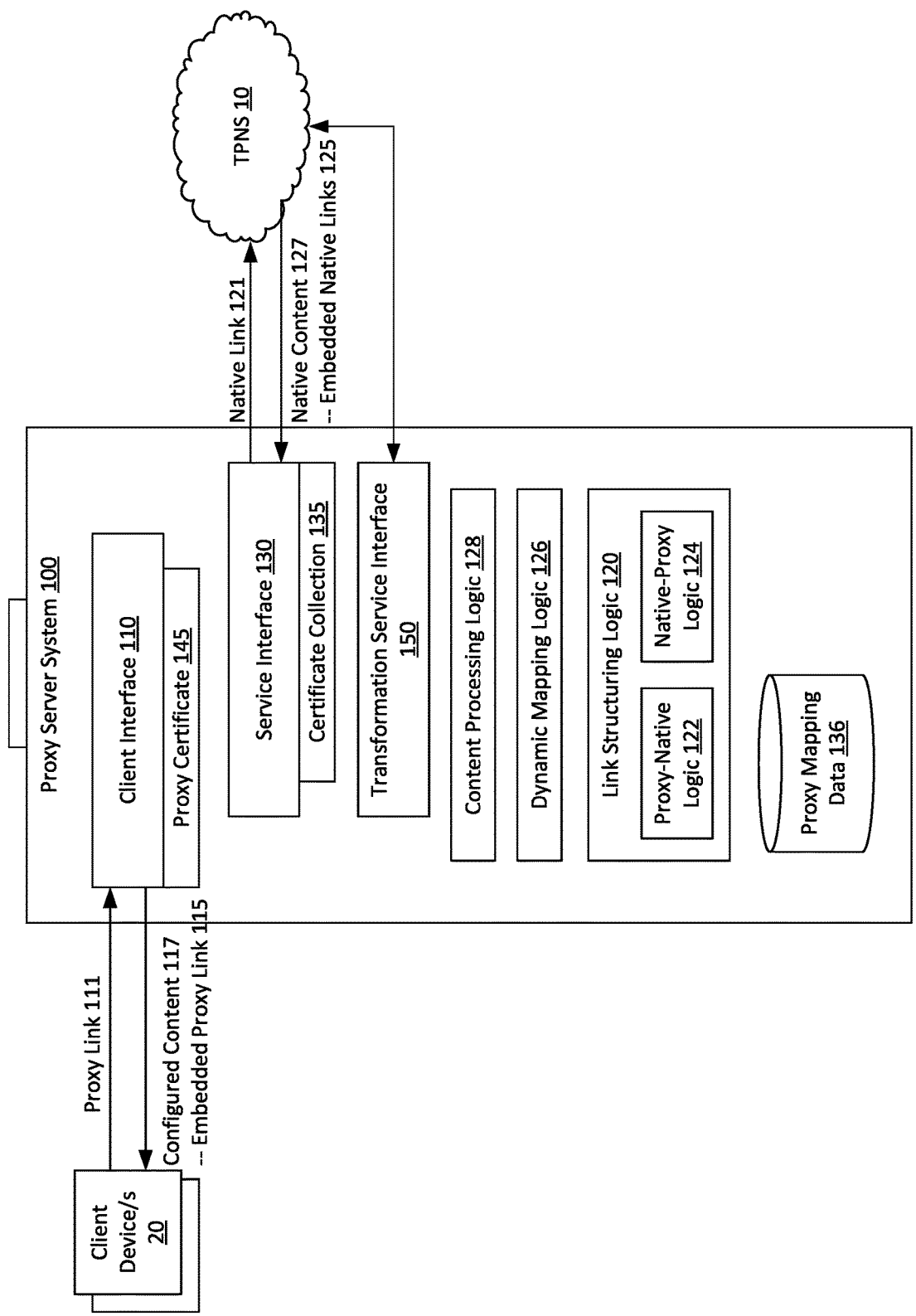
FIG. 1 illustrates an example proxy computer system, according to one or more embodiments.

Examples provide techniques for dynamic domain discovery and proxy configuration, which may be implemented in a proxy server system for use with clients that utilize network services. The proxy server system may enable enterprise networks to utilize enhanced or ancillary services of the proxy server system in connection with third-party network services. In examples, a self-configuring proxy server system provides a proxy service that transforms native links that include a domain associated with a particular third-party network service to proxy links that include a domain associated with the proxy server system, thereby allowing the proxy server system to act as an intermediary in a session between a client device and the third-party network service. In examples, the proxy service is a suffix proxy service.

In examples, the proxy server system automatically configures proxy mapping data for a particular third-party network service based on domains the proxy server system encounters when processing native content obtained from the third-party network service. The native content may include resources requested by client devices via the proxy server system using proxy links. The proxy server system processes the native content and automatically discovers new domains not previously handled, or known, by the proxy server system. Upon discovery, a new domain is dynamically mapped to a proxy string. The proxy server system maintains proxy mapping data that stores, for one or more third-party network services, a set of mappings that each associate a domain and a proxy string.

The proxy server system can automatically generate proxy mapping data for a third-party network service without prior knowledge. The self-configuration of proxy mapping data by the proxy server system is dynamically adaptable, fault tolerant, scalable, and eliminates the requirement for manual configuration of predefined domain lists for each third-party network service. By dynamically maintaining proxy mapping data, the proxy server system is more resilient to domain changes by cloud and SaaS vendors. The proxy server system may self-configure in an automated manner, even for third-party network applications with an extensive array of domains for authentication, content, content distribution, analytics, external services, and the like.

In some examples, a proxy server system operates to parse and transform Uniform Resource Locators (URLs) which are provided from or for use with the third-party service. The proxy server system may perform link transformation operations on native links to generate proxy links that are provided to clients. The native links include a domain associated with the third-party service, while the proxy links include a domain associated with the proxy server system.

In examples, a client device submits a request to the proxy server system by activating a proxy link that includes a domain associated with the proxy server system, also referred to as a "proxy domain". The proxy link is associated with a target resource hosted by the third-party network service. The proxy server system performs a link transformation operation to reconstruct a corresponding native link that includes a domain associated with the third-party network service, also referred to as a "native domain". To respond to the request from the client device, the proxy server system uses the corresponding native link to obtain native content including the target resource.

In examples, the response includes configured content generated by the proxy server system. The proxy server system generates the configured content by performing link transformation operations on embedded native links in the native content. The configured content includes embedded proxy links that include a domain associated with the proxy server system. The link transformation operations are performed using the proxy mapping data. The link transformation operations performed by the proxy server system may be transparent to the client device and/or the third-party network service. As used herein, the term "embedded link" refers to an element within web content that can be activated to go to a specified address, such as a URL, and the term "link" refers to either the element or the address (e.g., the URL).

In some examples, a proxy server system maintains proxy mapping data including a plurality of mappings, each mapping associating a domain and a proxy string. The proxy server system receives a request including a proxy link, generates a native link that includes a domain associated with the third-party network service, and obtains a resource including native content from the third-party network service. The proxy server system identifies, in the native content, a first embedded native link that includes a first domain associated with the third-party network service, determines that the proxy mapping data does not include any mapping corresponding to the first domain, generates a first mapping associating the first domain and a first proxy string, and updates the proxy mapping data to include the first mapping.

One or more examples described herein provide that methods, techniques, and actions performed by a computing device are performed programmatically, or as a computer-implemented method. as used herein, programmatically means using code or computer-executable instructions. These instructions can be stored in one or more memory resources of a computing device. A programmatically performed step may or may not be automatic.

One or more examples described herein can be implemented using programmatic modules, logic, engines, or components. A programmatic module, logic, engine, or component can include a program, a sub-routine, a portion of a program, or a software component or a hardware component capable of performing one or more stated tasks or functions. As used herein, a module, logic, engine, or component can exist on a hardware component independently of other modules or components. Alternatively, a module, logic, engine, or component can be a shared element or process of other modules, programs or machines.

Furthermore, one or more examples described herein may be implemented using instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, servers, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Overview

FIG. 1 illustrates an example proxy computer system, according to one or more embodiments. In an example of FIG. 1, a proxy server system 100 may be implemented using a server, or a combination of servers, to receive and forward communications between a plurality of client devices 20 and one or more third-party network services ("TPNS") 10. Each client device 20 may correspond to an user computing device, such as a desktop computer, cell phone, mobile device, computer terminal, virtualized computer, or other computer system capable of communicating with the proxy server system 100 over the World Wide Web and/or other data networks. Among other functionality, the proxy server system 100 can include or otherwise provide enhanced proxy service functionality, such as a traffic monitoring, an encryption, security rule and policy enforcement, content configuration, and/or other functionality.

The TPNS 10 may correspond to a cloud service, such as a software-as-a-service (SaaS) provider. While one TPNS 10 is illustrated, the proxy server system 100 may implement a proxy service for one or multiple TPNS 10. With respect to an example of FIG. 1, the TPNS 10 hosts resources for use in connection with its service. The resources are accessible from the TPNS 10 using native links 121.

A native link 121 corresponds to a target resource hosted by the TPNS 10 and includes a domain associated with the TPNS 10 hosting the target resource. Cloud service and/or SaaS providers typically utilize native links with multiple levels of subdomains to implement their respective services. For example, an "Example" service may utilize an "example.com" root domain and further structure their respective URLs to specify one or more subdomains (e.g., "system" and "na1" in "system.na1.example.com"). As used herein, a domain refers to a string that identifies a network domain and/or an Internet Protocol (IP) resource. For example, a domain may refer to a root domain (e.g., "example.com") and/or a root domain with one or more subdomains (e.g., "na1.example.com", "system.na1.example.com").

The proxy server system 100 provides a proxy service by acting as an intermediary between a client device 20 and a TPNS 10. A client device 20 may initiate or continue a session with the TPNS 10 through the proxy service by using a proxy link 111 that corresponds to a target resource hosted by the TPNS 10. The proxy link 111 includes a domain associated with the proxy server system 100. For example, the proxy server system 100 may own and/or control a network domain corresponding to the domain in a proxy link 111. The proxy server system 100 may utilize one or multiple root domains to implement the proxy service. Proxy links 111 are referred to as having a proxy domain format.

The proxy server system 100 maintains proxy mapping data 136. The proxy mapping data 136 includes a plurality of mappings that each associate a domain and a proxy string. A proxy string is a sequence of characters that is unique for each native domain. That is, a proxy string is not associated with multiple native domains. A mapping may include both the proxy string and a native domain associated with a TPNS 10. As an alternative or addition, the mapping may include enough information to look up the mapping given a proxy string, look up the mapping given a native domain and optionally session information, generate a proxy string from a native domain, and generate a native domain from a proxy string. For example, if a proxy string is generated by a reversible formula applied to a native domain, the mapping may associate the native domain with the reversible formula, thereby indirectly associating the native domain with the proxy string.

In examples, multiple proxy strings may be associated with one native domain. For example, the proxy mapping data 136 may include different proxy strings for the same native domain so that a first user accesses the native domain using a first proxy link 111 generated based on a first mapping corresponding to a second proxy string, and a second user accesses the native domain using a second proxy link 111 generated based on a second mapping corresponding to a second proxy string. The different proxy strings may be used to encode or track information, such as different security levels, different user types, different locations, different target resource types, and/or other information.

In examples, the proxy server system 100 generates at least a portion of the mappings in the proxy mapping data 136. For example, the proxy server system 100 may dynamically, or during operation, discover one or more domains in content retrieved from one or more third-party network services 10 and generate corresponding mappings to configure the proxy service. The proxy mapping data 136 may include one or more files, databases, or other data stores, and may include one or more tangible and/or virtual data storage locations, which may or may not be physically co-located. Proxy mapping data 136 is described in greater detail hereinafter.

A client device 20 uses the proxy link 111 to access the target resource using the proxy server system 100 as an intermediary. The proxy server system 100 processes the proxy link 111 to reconstruct a corresponding native link 121 that includes a domain associated with the TPNS 10. For example, the TPNS 10 may own and/or control a network domain corresponding to the domain in a native link 121. A native link 121 may be used to access the target resource hosted by the TPNS 10. Native links 121 are referred to as having a native domain format.

The TPNS 10 may utilize one or multiple root domains to implement its network service. For example, a TPNS 10 may own or control the root domains "example.com" and "sample.com", and use both root domains to implement an "Example" service. In examples, the TPNS 10 may utilize third-party root domains to implement its network service. For example, a TPNS 10 may use a root domain owned or controlled by a related entity (e.g., "affiliate.com") to implement its network service. As another example, a TPNS 10 may use a service owned or controlled by a third-party (e.g., "analytics.com") to implement its network service. As used herein, "a domain associated with a third-party network service" includes any domain used by the TPNS 10 to implement its network service. As used herein, "a domain associated with a third-party network service" may include a root domain from a set of one or more root domains that may include one or more root domains owned by the owned or controlled by the TPNS 10 and/or one or more third-party root domains.

The proxy server system 100 uses the native link 121 to obtain native content 127 comprising the target resource from the TPNS 10. The native content 127 may include one or more embedded native links 125 in the native domain format. The proxy server system 100 modifies the native content 127 to generate configured content 117 that includes one or more embedded proxy links 115. An embedded proxy link 115 corresponds to a resource targeted by a corresponding embedded native link 125, and includes a domain associated with the proxy server system 100. The proxy server system 100 generates an embedded proxy link 115 by transforming the corresponding embedded native link 125 using proxy mapping data 136.

The proxy server system 100 provides the configured content 117 with the embedded proxy links 115 to the client device 20. In examples, the proxy server system 100 may operate without the use of scripts (e.g., browser executable code) on the client device 20. The client device 20 may activate an embedded proxy link 115 in the configured content 117, causing the session between the client device 20 and the TPNS 10 to continue, with the proxy server system 100 acting as an intermediary.

In examples, the proxy server system 100 makes all session requests to the TPNS 10 on behalf of the client device 20. For example, all embedded native links 125 may be transformed into embedded proxy links 115 so that the proxy server system 100 acts as an intermediary for all communications between the client device 20 and the TPNS 10. The client device 20 only receives configured content 117 with embedded proxy links 115 having domains associated with the proxy server system 100, causing all traffic to be routed back through the proxy server system 100.

As an alternative or addition, the proxy server system 100 may allow the client device 20 to obtain one or more target resources directly from the TPNS 10. For example, the proxy server system 100 may selectively transform embedded native links 125 so that the configured content 117 may include one or more embedded proxy links 115 and/or one or more embedded native links 125. In variations, the proxy server system 100 makes a determination as to whether one or more embedded native links 125 are suitable for direct access by a client device 20 from the TPNS 10. The proxy server system 100 may make the determination based on one or more factors, such as a resource type of the target resource, a load on the proxy server system 100, the sensitivity of data related to the target resource, and/or other factors. When the proxy server system 100 determines that an embedded native link 125 may be directly accessed by a client device 20, the proxy server system 100 includes the embedded native link 125 in the configured content 117 such that activation of the embedded native link 125 at the client device 20 bypasses the proxy server system 100 and directly retrieves the corresponding resource from the TPNS 10.

In examples, as an alternative or addition, the proxy server system 100 may implement a link transformation web service that is accessible via a transformation service interface 150. The transformation service interface 150 can correspond to, for example, a Representation State Transfer ("REST") Application Programming Interface ("API") or a Simple Object Access Protocol ("SOAP") API. In examples, the link transformation web service may provide a native link 121 that corresponds to a proxy link 111, or a proxy link 111 that corresponds to a native link 121. As an alternative or addition, the link transformation web service may provide a domain that corresponds to a proxy string, or a proxy string that corresponds to a domain. As an alternative or addition, the link transformation web service may provide a domain that corresponds to a proxy link 111, or a proxy string that corresponds to a native link 121.

For example, the transformation service interface 150 may, in response to a transformation request that includes a submitted domain (e.g., a domain or a native link 121), obtain a corresponding mapping from the proxy mapping data 136, and provide a response that includes a proxy string from the corresponding mapping (e.g., a proxy string or a proxy link 111). As another example, the transformation service interface 150 may, in response to a transformation request that includes a submitted proxy string (e.g., a proxy string or a proxy link 111), obtain a corresponding mapping from the proxy mapping data, and provide a response that includes a domain from the corresponding mapping (e.g., a domain or a native link 121).

According to some examples, the proxy server system 100 includes a client interface 110. The client interface 110 handles communications with individual client devices 20. In examples, the client interface 110 receives requests comprising proxy links 111 that are activated by applications executing on the client devices 20, such as but not limited to a browser application, mobile application, web application, or any other application that interacts with web content. For example, an incoming proxy link 111 may correspond to a URL that includes syntax elements which specify a domain of the proxy server system 100. The client interface 110 may provide responses to the client devices 20 that include configured content 117. The configured content 117 may include one or more embedded proxy links 115 that each correspond to a resource hosted by the TPNS 10 and include a domain associated with the proxy server system 100. When an embedded proxy link 115 is activated at the given client device 20, the given client device 20 sends a request to the proxy server system 100 that is handled by the client interface 110.

According to some examples, the proxy server system 100 includes a service interface 130. The service interface 130 handles communications with the TPNS 10 in the course of providing proxy services. In examples, the service interface 130 submits requests comprising native links 121 to resources hosted by the TPNS 10 in response to requests by client devices 20 using corresponding proxy links 111. The service interface 130 may also receive responses from the TPNS 10 comprising native content 127 corresponding to the requested resources. In some examples, the service interface 130 may operate like a browser application of a client device 20.

In communicating with TPNS 10, the service interface 130 may access and use SSL certificates maintained by the proxy server system 100 in a certificate collection 135. The SSL certificates of the certificate collection 135 are issued to the TPNS 10 by a recognized certificate authority allow clients, including client devices 20 and the service interface 130, to directly access the TPNS 10 securely. As described by other examples, the TPNS 10 may utilize subdomains which separately require a specific SSL certificate from the requesting browser component (e.g., the service interface 130). Secure Socket Layer (SSL) certificate infrastructure allows for a single-level wildcard certificate for one subdomain level. The certificate collection 135 may include one or more wildcard certificates.

According to some examples, the proxy server system 100 includes content processing logic 128, dynamic mapping logic 126, and link transformation logic 120. The link transformation logic 120 may include proxy-native logic 122 and native-proxy logic 124. As described herein, logical components of the proxy server system 100 (e.g., content processing logic 128, dynamic mapping logic 126, link transformation logic 120, proxy-native logic 122, and/or native-proxy logic 124) are presented individually for ease of explanation, but the implementation thereof is not limited to the illustrated structure. For example: a logical component may be implemented as one or more dependent or independent programs and/or processes; a logical component may be implemented on one or multiple computers; a logical component may be implemented fully and/or partially in one or more programs or processes; two or more logical components may be implemented fully and/or partially in one program and/or process. The proxy server system 100 may include one or multiple instances of a logical component. Any action involving (e.g., performed by or to) one or more logical components of the proxy server system 100 may be considered performed with respect to (e.g., performed by or to) the proxy server system 100.

Processing Native Content

The content processing logic 128 processes the native content 127 received from the TPNS 10 and generates configured content 117 to provide to the requesting client device 20. The content processing logic 128 may execute in response to the service interface 130 receiving native content 127 from the TPNS 10. The content processing logic 128 may perform and/or initiate operations such as but not limited to: parsing native content 127 to identify embedded native links 125, discovering a new domain, generating a new mapping associating a new domain and a proxy string, updating the proxy mapping data 136 with the new mapping, transforming embedded native links 125 to embedded proxy links 115, and generating configured content 117 from the native content 127.

Figure 2:
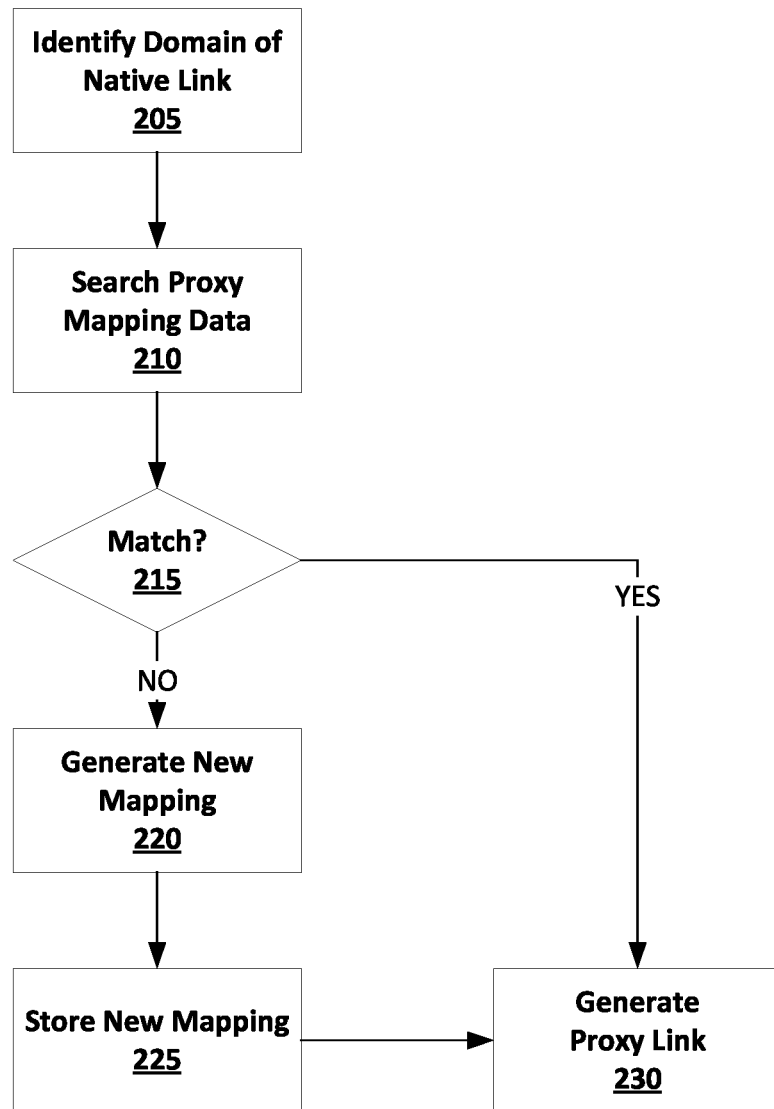
FIG. 2 illustrates an example flow chart for processing embedded native links in native content retrieved from a third-party network service.

FIG. 2 illustrates an example process for processing embedded native links in native content retrieved from a third-party network service. The example process of FIG. 2 may be performed by, for example, a proxy server system (e.g., proxy server system 100) or component thereof (e.g., content processing logic 128). Accordingly, reference may be made to elements of FIG. 1 for purpose of illustrating suitable components for performing a step or sub-step being described.

The content processing logic 128 may identify a set of one or more embedded native links 125 in the native content 127 to transform into embedded proxy links 115 in the proxy domain format. For example, the content processing logic 128 may parse the native content 127 to identify the embedded native links 125 for transformation. The content processing logic 128 may transform all or a portion of the embedded native links 125 having the native domain format to proxy links having the proxy domain format. The transformed proxy links are included in configured content 117 as embedded proxy links 115. The example process of FIG. 2 describes the transformation process for an individual embedded native link 125, and may be repeated for each embedded native link 125.

The content processing logic 128 identifies a domain in an embedded native link 125 to a specified resource hosted by a TPNS 10 (205). The content processing logic 128 searches the proxy mapping data 136 (210) to determine whether a mapping exists for the identified domain (215). For example, the content processing logic 128 may query a database that stores mappings between third-party domains associated with the TPNS 10 and proxy strings corresponding to domains associated with the proxy server system 100.

If a mapping exists for the identified domain (215), the content processing logic 128 generates a proxy link by transforming the current embedded native link 125 using the existing mapping for the identified domain (230). For example, the content processing logic 128 may use the native-proxy logic 124 to transform the current embedded native link 125 and generate a corresponding embedded proxy link 115 that is included in the configured content 117.

Otherwise, if a mapping does not exist (215), the content processing logic 128 generates a new mapping (220). For example, the content processing logic 128 may use the dynamic mapping logic 126 to generate a new mapping for the identified domain. The new mapping associates the identified domain and a proxy string corresponding to a domain associated with the proxy server system 100. The dynamic mapping logic 126 and/or the content processing logic 128 may cause the new mapping to be stored in the proxy mapping data 136, making the new mapping available for future use by the proxy server system 100 (225).

The content processing logic 128 generates a proxy link by transforming the embedded native link 125 using the new mapping for the identified domain (230). For example, the content processing logic 128 may use link transformation logic 120, such as native-proxy logic 124, to generate a proxy link corresponding to the embedded native link 125 and the specified resource. The generated proxy link may be included as an embedded proxy link 115 in configured content 117 that is provided to a client device 20.

When the embedded proxy link 115 is activated at the client device 20, the client device 20 sends a second request that includes a URL associated with the embedded proxy link 115 to the proxy server system 100, which acts as an intermediary to access the second resource specified. The proxy server system 100 may use link transformation logic 120, such as proxy-native logic 124, to generate a second native link corresponding to the URL. For example, the proxy-native logic 124 may identify a proxy string in the URL, search the proxy mapping data 136 for a mapping that associates the proxy string and a domain associated with the TPNS 10, and use the mapping to generate the second native link. The content processing logic 128 may process the second resource as described in FIG. 2.

Domain Mapping and Link Transformation

A native link 121 may specify multiple levels of subdomains of a root domain selected from one or more root domains that the TPNS 10 utilizes to implement the network service. The TPNS 10 may utilize multiple levels of subdomains to handle various factors, such as geographical location and content delivery issues. For example, a TPNS may utilize a native domain "system.na1.example.com", where the "na1" subdomain signifies a first set of server infrastructure located in North America. The TPNS 10 may also utilize the native domain "system.na2.example.com", where the "na2" subdomain signifies a second set of server infrastructure located in North America.

A naïve suffix proxy construction of a proxy link for a native domain "system.na1.example.com" may be generated by appending a proxy domain: "system.na1.example.com.proxy.com". In this case, "system", "na1", "example", and the first "com" are all subdomains, while "proxy.com" is the root domain associated with the proxy server system 100. To support the use of multiple subdomains, multiple certificates may be needed to avoid problems such as certificate warnings and non-renderable portions of a page.

The proxy server system 100 may format proxy links 111, 115 in a manner that lessens the need for client devices 20 to use a complex set of SSL certificates with the proxy server system 100. In examples, the dynamic mapping logic 126 and/or the link transformation logic 120 operate such that native domains are mapped to proxy strings that are included in proxy links without requiring additional SSL certificates. For example, a native domain may be flattened into a proxy string that can be included as a single subdomain. As used herein, the term "flattened" refers to a string with characters that a browser would interpret as a single subdomain. For example, a flattened string would not include the period "." character, and may be restricted to the character set {[a-z], [0-9], -}, where "-" is not a starting or ending character.

In examples, the proxy server system 100 operates using a specified set of one or more proxy certificates 145 that include one or more wildcard certificates. For example, the proxy certificate/s 145 may include one wildcard certificate 145 for each root domain utilized by the proxy server system 100 (e.g., "*.proxy.com"). In this case, the proxy certificate 145 for "*.proxy.com" is valid for the proxy link "xyz123.proxy.com" or any other proxy link that includes a single flattened proxy string as a subdomain of the root domain "proxy.com". This allows the client device 20 to communicate with the proxy server system 100 using a single wildcard certificate for each root domain. In this way, the client device 20 does not need configuration beyond a standard configuration.

The dynamic mapping logic 126 may select or generate a proxy string to associate with a native domain. The dynamic mapping logic 126 may use one or more techniques, such as but not limited to the example techniques described hereinafter, to generate proxy strings for mappings in the proxy mapping data 136. The dynamic mapping logic 126 may use different techniques for different sets of domains, such as different root domains, different parent subdomains, different security levels, different user types, different locations, different target resource types, and/or other classifications.

In examples, the dynamic mapping logic 126 uses a random procedure to generate a proxy string. For example, all or part of a proxy string may be generated randomly. In examples, a randomly-generated proxy string may follow one or more formatting rules, such as length, character sets, character types in specific positions, and the like.

In examples, the dynamic mapping logic 126 uses a sequential procedure to generate a proxy string. A sequentially-generated proxy string may include sequential characters relative to a set of proxy strings. The set of proxy strings may include proxy strings for all or a portion of mappings in the proxy mapping data 136. In examples, native domains having a particular root domain are generated sequentially in the order of discovery. The following are examples of sequentially-generated proxy strings: {"1253", "1254", "1255" }; {"1253", "1263", "1273" }; {"a", "b", "c" }; {"A1", "A2", "A3" }; {"Example-1", "Example-2", "Example-3" }; and {"1-Example", "2-Example", "3-Example" }.

In examples, the dynamic mapping logic 126 uses a regular-expression-based procedure to generate a proxy string. For example, the dynamic mapping logic 126 may detect text in a native domain that is commonly used for a particular purpose, such as for authenticating a user. The dynamic mapping logic 126 may include characters in the proxy string that indicate the particular purpose. For example, if the dynamic mapping logic 126 detects the term "login" in a native domain (e.g., "login.example.com"), the dynamic mapping logic 126 may generate a proxy string that indicates this purpose in a manner that is recognizable to a user of a client device 20 (e.g., "login", "login-example" as proxy strings, or "login.proxy.com", "login-example.proxy.com" as native domains).

In examples, the dynamic mapping logic 126 uses a translation-based procedure to generate a proxy string. A translation-based procedure uses a formula to generate the proxy string based on the native domain. For example, the formula may be a reversible encryption algorithm or other reversible function.

In examples, the dynamic mapping logic 126 uses a prefix and/or suffix to generate a proxy string. A prefix and/or suffix may encode information such as but not limited to different root domains, different parent subdomains, different security levels, different user types, different locations, different target resource types, and/or other information. A prefix and/or suffix may be combined with random procedures, sequential procedures, regular-expression-based procedures, translation-based procedures, or other procedures for generating a proxy string. For example, {"EX1", "EX2", "EX3"} is a sequential set of proxy strings using a prefix, and is a randomized set of proxy strings using a suffix {"2635EX", "6752EX", "9347EX"}.

In examples, the dynamic mapping logic 126 generates proxy strings in a context-aware manner. For example, the dynamic mapping logic 126 may generate a mapping in a location-aware manner such that a first mapping associated with a first proxy string is used for client devices 20 located in a first location, while a second mapping associated with a second proxy string is used for client devices 20 located in a second location. A proxy string may be generated to encode contextual data relating to at least one of a client device 20, a TPNS 10, a session between the client device 20 and the TPNS 10, or other contextual information.

In examples, the dynamic mapping logic encodes contextual information, such as but not limited to routing information, security information, and other information. For example, contextual information may be encoded using prefixes, suffixes, or other patterns in the proxy string. In examples, the contextual information may indicate different categories of users, such as internal users and external users with respect to an enterprise. In examples, the proxy server system 100 may use the contextual information to trigger different security polices, such as different encryption techniques applied to content native content 127 processed by the proxy server system 100.

In examples, the proxy server system 100 provides a suffix proxy service that implements the dynamic domain discovery and proxy configuration techniques described herein. For example, the native-proxy logic 124 may generate a proxy link 111 from a native link 121 by replacing a domain in the native link 121 with a corresponding proxy string based on a mapping and appending a domain associated with the proxy server system 100, as illustrated by the following example:
Native link: home.cdn.example.com/test
Native Domain: home.cdn.example.com
Proxy string: xyz123
Proxy domain: proxy.com
Proxy link: xyz123.proxy.com/test In this case, the proxy link 111 includes the proxy string in a subdomain portion of the proxy link 111. The proxy-native logic 122 may generate the native link 121 from the proxy link 111 by replacing the proxy string with the corresponding domain and removing the domain associated with the proxy server system.

As an alternative or addition, the proxy server system 100 may provide a proxy service that includes the proxy string after the domain portion of the proxy link 111. For example, the proxy link 111 may include the proxy link 111 as part of a path. The native-proxy logic 124 may generate a proxy link 111 from a native link 121 by including the corresponding proxy string in the path of the proxy link 111, and the proxy-native logic 122 may generate the native link 121 from the proxy link 111 by parsing the proxy string from the path of the proxy link 111 and looking up the proxy string to find the corresponding domain associated with the TPNS 10 in the proxy mapping data 136. The following example illustrates including the proxy string as part of the path:
Native link: home.cdn.example.com/test
Proxy link: secure.proxy.com/xyz123/test In examples, the proxy link 111 may include information indicating how to parse the proxy string from the proxy link 111. For example, the "secure" subdomain may indicate a position of the proxy string in the path. As another example, the proxy string may be designated by a predetermined character set:
Proxy link: www.proxy.com/PROXYSTR-xyz123/test In examples, the proxy link 111 may include the proxy link 111 as a parameter. The native-proxy logic 124 may generate a proxy link 111 from a native link 121 by including the corresponding proxy string as a parameter in the proxy link 111, and the proxy-native logic 122 may generate the native link 121 from the proxy link 111 by looking up the parameter to find the corresponding domain associated with the TPNS 10 in the proxy mapping data 136. The following example illustrates including the proxy string as a parameter:
Proxy link: www.proxy.com/test?map=xyz123

Configuration Operations

The proxy server system 100 may be configured to perform one or more configuration operations. A configuration operation allows an administrator or other authorized party to make changes to the proxy mapping data 136, such as adding a mapping, deleting a mapping, or modifying a mapping. For example, a configuration operation may be performed in response to a customer request, to address potential security threats, or for other reasons.

In examples, the proxy server system 100 implements an override operation. For example, the proxy server system 100 may perform the override operation in response to receiving an override command from an administrator. An override command includes, or relates to, a specified domain and a submitted proxy string. In response to the override command, the proxy server system 100 generates a custom mapping associating the specified domain and the submitted proxy string, and updates the proxy mapping data 136 to include the custom mapping. When the proxy mapping data 136 includes an existing mapping corresponding to the specified domain, the custom mapping replaces the existing mapping. The submitted proxy string will be used the next time the proxy server system 100 encounters the specified domain. An override command may be used to provide a user-friendly proxy link 111 corresponding to a native link 121 that is an entry point URL. For example, the domain "login.example.com" for an example TPNS 10 login page may be associated with a proxy string "example-login". An example proxy link 111 for the login page is "example-login.proxy.com".

In examples, the proxy server system 100 implements a reset operation. For example, the proxy server system 100 may perform the reset operation in response to receiving a reset command from an administrator. A reset command includes, or relates to, a set of one or more specified domains. In response to the reset command, the proxy server system 100 removes any mapping corresponding to any specified domain from the proxy mapping data 136. The proxy server system 100 will rediscover and regenerate a mapping for the specified domains the next time the proxy server system 100 encounters the domains.

In examples, the proxy server system 100 implements a reconfigure operation. For example, the proxy server system 100 may perform the reconfigure operation in response to receiving a reconfigure command from an administrator. A reconfigure command includes, or relates to, a set of one or more specified domains. In response to the reconfigure command, the proxy server system 100 generates a new proxy string for each mapping in the proxy mapping data 136 that corresponds to any specified domain. The proxy server system 100 updates each corresponding mapping with the new proxy string. The new proxy string will be used the next time the proxy server system 100 encounters the corresponding domain.

In examples, with respect to one or more configuration commands, one or more domains may be specified in various manners. For example, one or more domains may be explicitly specified. As an alternative or addition, the specified domains may include all the domains that the administrator or authorized party has authority to manage. As an alternative or addition, the specified domains may include all child domains of a specified domain. For example, when a root domain is specified, the specified domains include all child domains of the root domain. As an alternative or addition, the specified domains may include all domains associated with a particular TPNS 10.

Methodology

Figure 3:
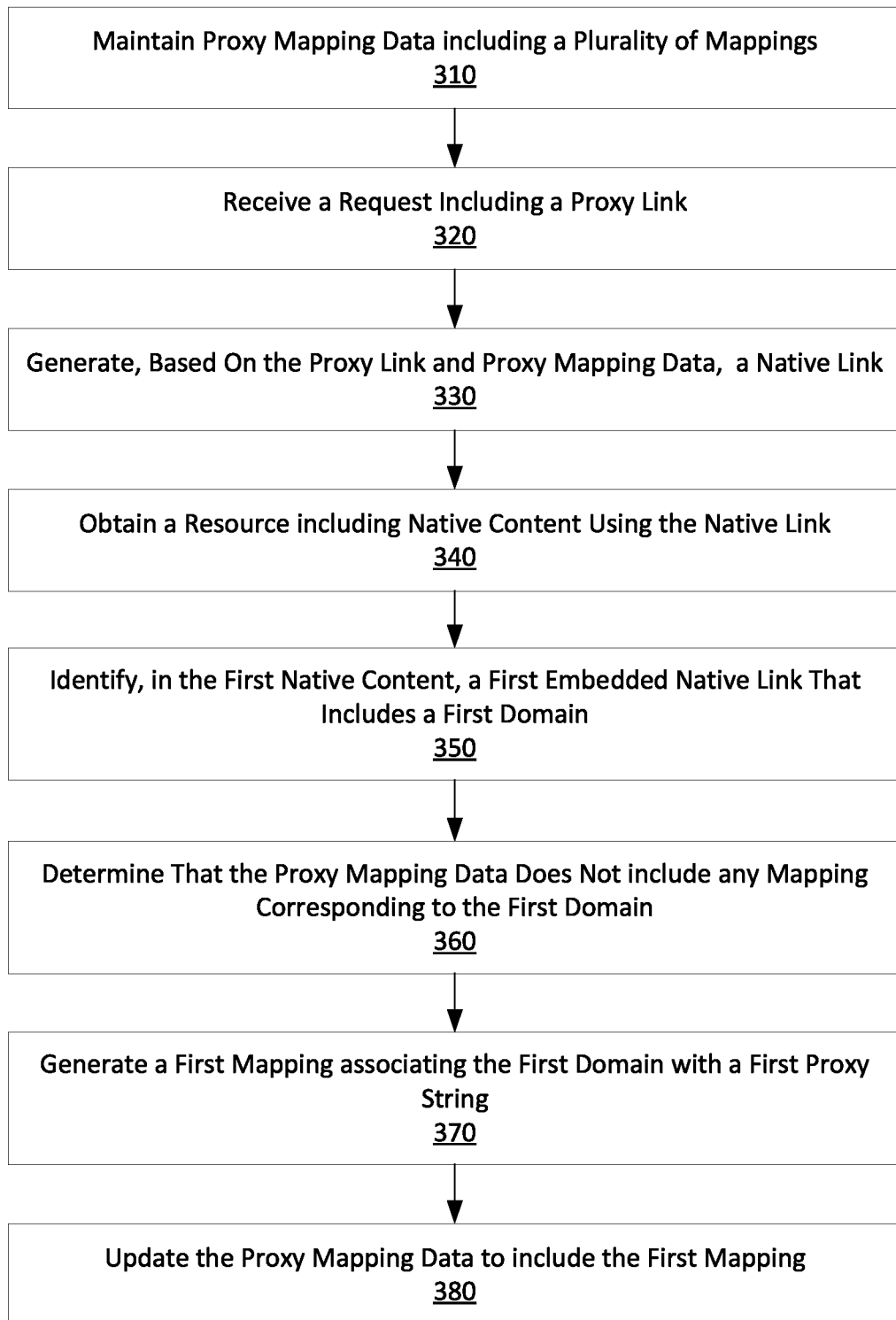
FIG. 3 illustrates an example process for operating a proxy server system that implements dynamic domain discovery and proxy configuration.

FIG. 3 illustrates an example process for operating a proxy server system that implements dynamic domain discovery and proxy configuration. Example processes such as described with FIG. 3 may be implemented using, for example, a proxy service system such as described with an example of FIG. 1. Accordingly, reference may be made to elements of FIG. 1 for purpose of illustrating suitable components for performing a step or sub-step being described.

With reference to FIG. 1, the proxy server system 100 maintains proxy mapping data 136 including a plurality of mappings (310). Each mapping of the proxy mapping data 136 associates a domain and a proxy string. In examples, the proxy server system 100 generates at least a portion of the mappings in the proxy mapping data 136. For example, the proxy server system 100 may dynamically, or during operation, discover one or more domains in content retrieved from one or more third-party network services 10 and generate corresponding mappings to configure the proxy service.

The proxy server system 100 receives, from a client device 20, a request including a proxy link 111 (320). The proxy link 111 includes a domain associated with the proxy server system 100. The proxy link 111 may correspond to a native link 121 that may be used to access a particular resource hosted by a third-party network service 10. For example, the client device 20 may submit the proxy link 111 to access the particular resource via the proxy server system 100.

The proxy server system 100 generates, based on the proxy link 111 and proxy mapping data 136, a native link 121 that includes a domain associated with the third-party network service 10 (330). In examples, the proxy server system 100 generates the native link 121 by identifying a proxy string in the proxy link 111, obtaining a mapping from the proxy mapping data 136 that corresponds to the proxy string, and generating the native link 121 from the proxy link 111 based on the mapping.

The proxy server system 100 obtains a resource including native content 127 from the third-party network service 10 using the native link (340). In examples, the proxy server system 100 generates configured content 117 based on the native content 127 and provides the configured content 117 to the client device 20. The configured content 117 includes one or more embedded proxy links 115 in replacement of one or more embedded native links 125.

The proxy server system 100 identifies, in the native content 127, a first embedded native link 125. The first embedded native link 125 has a first domain associated with the third-party network service 10 (350). The proxy server system 100 determines that the proxy mapping data 136 does not include any mapping corresponding to the first domain (360). The proxy server system 100 generates a first mapping associating the first domain and a first proxy string (370). The proxy server system 100 updates the proxy mapping data 136 to include the first mapping (380). The proxy server system 100 has now discovered the first domain, generated configuration data for the first domain that includes the first proxy mapping, and stored the configuration data for the first domain.

In examples, the proxy server system 100 generates a first proxy link 115 based on the first embedded native link 125 and the first mapping. For example, the proxy server system 100 may generate configured content 117 based on the native content 127, where the configured content includes the first proxy link 115 in replacement of the first embedded native link 125. The proxy server system 100 may provide the configured content 117 to the client device 20 in response to the request.

Hardware Diagrams

Figure 4:
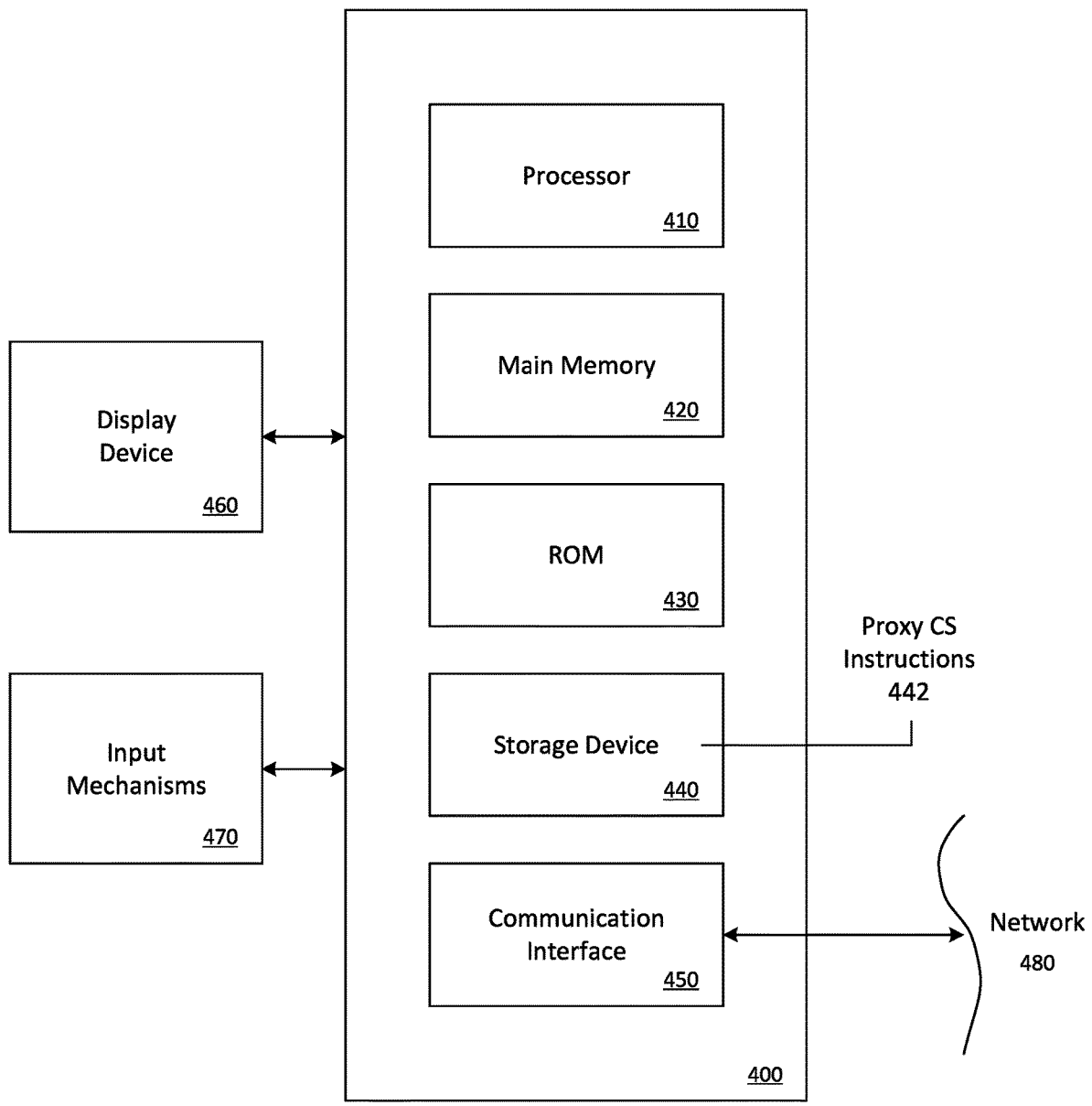
FIG. 4 is a block diagram that illustrates a computer system upon which embodiments described herein may be implemented.

FIG. 4 is a block diagram that illustrates a computer system upon which embodiments described herein may be implemented. For example, in the context of FIG. 1, the respective proxy computer system 100 may be implemented using a computer system such as described by FIG. 4. The proxy computer system 100 may also be implemented using a combination of multiple computer systems as described by FIG. 4.

In one implementation, a computer system 400 includes processing resources 410, a main memory 420, a read only memory (ROM) 430, a storage device 440, and a communication interface 450. The computer system 400 includes at least one processor 410 for processing information and the main memory 420, such as a random-access memory (RAM) or other dynamic storage device, for storing information and instructions to be executed by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions, including instructions 442 for implementing the example proxy computer systems 100 and 300. Additionally, the processor 410 can execute the instructions 442 to implement processes such as described with examples of FIGS. 2, 4, 5 and 6.

The communication interface 450 can enable the computer system 400 to communicate with one or more networks 480 (e.g., cellular network) through use of the network link (wireless or wireline). Using the network link, the computer system 400 can communicate with, for example, client devices 20, servers and one or more third-party network services 10.

The computer system 400 can also include a display device 460, such as an LCD monitor, or a television set, for example, for displaying graphics and information to a user, or no display device at all as with some servers. One or more input mechanisms 470, such as a keyboard that includes alphanumeric keys and other keys, can be coupled to the computer system 400 for communicating information and command selections to the processor 410. Other non-limiting, illustrative examples of input mechanisms 470 include a mouse, a trackball, touch-sensitive screen, or cursor direction keys for communicating direction information and command selections to the processor 410 and for controlling cursor movement on the display device 460.

Examples described herein are related to the use of the computer system 300 for implementing the techniques described herein. According to one embodiment, those techniques are performed by the computer system 300 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following Claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A proxy server system comprising:
   one or more processors;
   a memory resource storing a set of instructions that, when executed by the one or more processors, cause the one or more processors to:
   maintain proxy mapping data including a plurality of mappings, each mapping associating a domain and a proxy string;
   receive, from a client device, a request including a proxy link that includes a domain associated with the proxy server system;
   generate, based on the proxy link and the proxy mapping data, a native link that includes a domain associated with a third-party network service;
   obtain a resource including native content from the third-party network service using the native link;
   identify, in the native content, a first embedded native link having a first domain associated with the third-party network service;
   determine that the proxy mapping data does not include any mapping corresponding to the first domain;
   generate a first mapping associating the first domain and a first proxy string; and
   update the proxy mapping data to include the first mapping.

2. The proxy server system of claim 1, wherein the instructions, when executed by the one or more processors, cause the one or more processors to:
   generate, based on the first embedded native link and the first mapping, a first proxy link that includes the first proxy string and a domain associated with the proxy server system;
   generate configured content based on the native content, wherein the configured content includes the first proxy link in replacement of the first embedded native link; and
   provide the configured content to the client device in response to the request.

3. The proxy server system of claim 2, wherein the instructions, when executed by the one or more processors, cause the one or more processors to:
   identify, in the native content, a second embedded native link having a second domain associated with the third-party network service;
   determine that the proxy mapping data includes a second mapping associating the second domain and a second proxy string; and
   generate, based on the second embedded native link and the second mapping, a second proxy link that includes the second proxy string and a domain associated with the proxy server system;
   wherein the configured content includes the second proxy link in replacement of the second embedded native link.

4. The proxy server system of claim 2, wherein the instructions, when executed by the one or more processors, cause the one or more processors to:
   receive, from the client device, a second request including the first proxy link;
   identify the first proxy string in the first proxy link;
   determine that the proxy mapping data includes the first mapping by searching the proxy mapping data for the first proxy string;
   generate, based on the first mapping, a second native link including the first domain, wherein the second native link is equivalent to the first embedded native link;
   obtain a second resource including second native content from the third-party network service using the second native link;
   generate second configured content based on the second native content and the proxy mapping data; and
   provide the second configured content to the client device in response to the second request.

5. The proxy server system of claim 2, wherein the first proxy link includes the first proxy string in a subdomain portion of the first proxy link.

6. The proxy server system of claim 2, wherein the first proxy link includes the first proxy string after a domain portion of the first proxy link.

7. The proxy server system of claim 1, wherein the instructions, when executed by the one or more processors, cause the one or more processors to:
   receive an override command including a third domain and a third proxy string;
   generate a third mapping associating the third domain and the third proxy string; and
   update the proxy mapping data to include the third mapping, wherein when the proxy mapping data includes an existing mapping corresponding to the third domain, the third mapping replaces the existing mapping.

8. The proxy server system of claim 1, wherein the instructions, when executed by the one or more processors, cause the one or more processors to:
receive a reset command corresponding to one or more domains; and
in response to the reset command, remove any mapping corresponding to any domain of the one or more domains from the proxy mapping data.

9. The proxy server system of claim 1, wherein the instructions, when executed by the one or more processors, cause the one or more processors to:
receive a reconfigure command corresponding to one or more domains; and
in response to the reconfigure command, for each mapping of the plurality of mappings that corresponds to any domain of the one or more domains, generate a new proxy string for the mapping and update the mapping with the new proxy string in the proxy mapping data.

10. The proxy server system of claim 1, wherein the instructions, when executed by the one or more processors, cause the one or more processors to:
provide a link transformation service that:
(i) in response to a first transformation request that includes a submitted domain, obtains a first corresponding mapping from the proxy mapping data and provides a first transformation response that includes a proxy string of the first corresponding mapping; and
(ii) in response to a second transformation request that includes a submitted proxy string, obtains a second corresponding mapping from proxy mapping data and provides a second transformation response that includes a domain of the second corresponding mapping.

11. The proxy server system of claim 1, wherein the first proxy string encodes contextual data relating to at least one of the client device, the third-party network service, and a session between the client device and the third-party network service.

12. The proxy server system of claim 1, wherein the first proxy string includes random characters.

13. The proxy server system of claim 1, wherein the first proxy string includes sequential characters relative to a set of proxy strings.

14. The proxy server system of claim 1, wherein the first proxy string includes at least one of predetermined prefix characters and predetermined suffix characters.

15. The proxy server system of claim 1, wherein the first proxy string encodes security policy information.

16. A method for providing a proxy service, the method being implemented by one or more processors of a network computer system and comprising:
maintaining proxy mapping data including a plurality of mappings, each mapping associating a domain and a proxy string;
receiving, from a client device, a request including a proxy link that includes a domain associated with a proxy server system;
generating, based on the proxy link and the proxy mapping data, a native link that includes a domain associated with a third-party network service;
obtaining a resource including native content from the third-party network service using the native link;
identifying, in the native content, a first embedded native link having a first domain associated with the third-party network service;
determining that the proxy mapping data does not include any mapping corresponding to the first domain;
generating a first mapping associating the first domain and a first proxy string; and
updating the proxy mapping data to include the first mapping.

17. The method of claim 16, further comprising:
generating, based on the first embedded native link and the first mapping, a first proxy link that includes the first proxy string and a domain associated with the proxy server system;
generating configured content based on the native content, wherein the configured content includes the first proxy link in replacement of the first embedded native link; and
providing the configured content to the client device in response to the request.

18. The method of claim 16, further comprising:
receiving an override command including a third domain and a third proxy string;
generating a third mapping associating the third domain and the third proxy string; and
updating the proxy mapping data to include the third mapping, wherein when the proxy mapping data includes an existing mapping corresponding to the third domain, the third mapping replaces the existing mapping.

19. The method of claim 16, further comprising:
providing a link transformation service that:
(i) in response to a first transformation request that includes a submitted domain, obtains a first corresponding mapping from the proxy mapping data and provides a first transformation response that includes a proxy string of the first corresponding mapping; and
(ii) in response to a second transformation request that includes a submitted proxy string, obtains a second corresponding mapping from proxy mapping data and provides a second transformation response that includes a domain of the second corresponding mapping.

20. A non-transitory computer-readable medium that stores instructions, which when executed by one or more processors of a computer system, cause the computer system to perform operations that include:
maintaining proxy mapping data including a plurality of mappings, each mapping associating a domain and a proxy string;
receiving, from a client device, a request including a proxy link that includes a domain associated with the proxy server system;
generating, based on the proxy link and the proxy mapping data, a native link that includes a domain associated with a third-party network service;
obtaining a resource including native content from the third-party network service using the native link;
identifying, in the native content, a first embedded native link having a first domain associated with the third-party network service;
determining that the proxy mapping data does not include any mapping corresponding to the first domain;
generating a first mapping associating the first domain and a first proxy string; and updating the proxy mapping data to include the first mapping.

* * * * *